3,124,475
METAL SALT DRIER COMPOSITIONS
Alfred Fischer, Bronx, N.Y., and Theodore A. Girard, Wayne, N.J., assignors to Heyden Newport Chemical Corporation, New York, N.Y., a corporation of Delaware
No Drawing. Filed Oct. 4, 1960, Ser. No. 60,314
9 Claims. (Cl. 106—310)

The present invention relates to metal salt compositions which are useful as driers for protective and decorative surfaces-coating compositions, such as paints, varnishes, printing inks, and the like. It further relates to a method for the preparation of these metal drier compositions. In addition it relates to a method for the production of acids of particular value in the preparation of metal salt driers.

Metal salts of organic acids have long been used in drying oil compositions and in surface-coating compositions containing these oils to hasten the drying process and to promote the polymerization of the unsaturated oils to dry, mechanically-resistant coatings. To be useful commercially as a drier, a metal salt should be stable indefinitely on storage, and it should be completely soluble in the hydrocarbon solvents ordinarily used in drier compositions as well as in drying oils, semi-drying oils, and vehicles prepared from these oils. It should form hydrocarbon solutions which have relatively low viscosity even at high metal salt concentrations so as to permit its ready dispersion in the vehicle, and it should not precipitate from the vehicle on prolonged storage. The metal salt should be effective as a drier in an amount that is not detrimental to the gloss, flexibility, adhesion, and other properties of the coating composition. In addition the metal salt should be uniform in composition and should be relatively low in cost.

A variety of organic acids have been suggested for use in the preparation of metal salt driers. These include acids obtained from animal and vegetable sources as well as those derived from petroleum products. The most widely used metal salt driers in the past have been those prepared from naphthenic acids, tall oil fatty acids; rosin and rosin acids; unsaturated fatty acids, such as oleic acid, linoleic acid, and linolenic acid; and saturated fatty acids, such as 2-ethylhexanoic acid and isooctanoic acid. While all of these acids form metal salts that are effective as driers, none forms salts that meet fully all of the requirements that have been established for driers. For example, neither 2-ethylhexanoic acid and other saturated acids having substituents in the 2-position of the carbon chain nor any of the saturated, straight chain fatty acids forms soluble basic lead salts. Since the average molecular weight of tall oil fatty acids is relatively high, drier compositions containing salts of these acids must have a high solids content in order to provide the necessary amount of metal. Then, too, unsaturated acids present in the tall oil fatty acids form salts that tend to oxidize and to become insoluble on storage. While naphthenic acids form salts that meet most of the requirements that have been established for driers, these acids may vary in composition and form products that are not uniform. In addition the naphthenate salts may impart color and odor to the surface-coating compositions.

A group of organic acids has now been found that forms metal salts that meet all of the aforementioned requirements for driers: They form hydrocarbon solutions of low viscosity that are stable even on prolonged storage at low temperatures. They are completely miscible with the oils and resins commonly used in surface coatings. They do not impart appreciable color or odor to surface-coating compositions. The salts improve the drying performance of paints, varnishes and other coating compositions without affecting their film properties, such as gloss and flexibility. These acids are uniform in quality, low in cost, and readily available commercially.

The acids that have been found to be valuable in the production of metal salt driers are saturated, branched-chain, acyclic acids which contain from 8 to 18 carbon atoms and preferably from 9 to 12 carbon atoms, which have at least 6 carbon atoms in the longest straight chain, and which have at least 2 carbon atoms in one or more side chains. These acids do not contain a quaternary carbon atom, that is, a carbon atom to which are attached two substituent groups, and they do not have a substituent group on the carbon atom in the 2- or alpha-position of the carbon chain. Illustrative of these acids are 3,5-dimethylhexanoic acid, 4-ethylnonanoic acid and 3-methyloctanoic acid. However, any acid that meets these structural requirements will form metal salts that can be used in the preparation of stable drier compositions. A single acid or a mixture of two or more of these acids may be used in the practice of the present invention.

Of particular value in the preparation of the metal driers are acids derived from aldehydes obtained from the reaction of $C_{7-17}$ olefins with carbon monoxide and hydrogen in the presence of a carbonylation catalyst.

The olefins from which the aldehydes are prepared may be those that occur in nature or they may be polymers of lower molecular weight olefins, such as propylene, butylene, or isobutylene. The procedures by which these olefins are converted to aldehydes are well known in the art.

Any of the well-known oxidation procedures may be used to convert the aldehydes to the corresponding acids. These include, for example, oxidation with oxygen or an oxygen-containing gas; oxidation with hydrogen peroxide or another peroxide; and oxidation with concentrated nitric acid. For reasons of economy and safety, oxygen and air are the preferred oxidizing agents. The oxidation is generally carried out by contacting the aldehyde mixture with the oxygen or oxygen-containing gas at a temperature between approximately 70° F. to 170° F., and preferably between approximately 80° F. and 130° F. The oxidation is considered complete when the acid number has reached the desired range or when the acid number of the reaction mixture increases at the rate of less than 5 units per hour. While this oxidation may be carried out in the presence of a solvent, such as benzene or naphtha, and a catalyst, such as sodium carbonate, neither solvent nor catalyst is used in the preferred oxidation procedure.

The crude acids as prepared by this procedure may be used without further treatment in the preparation of most of the metal salt compositions of the present invention. In order to form a basic lead salt that in hydrocarbon solution will have the required stability, however, it is necessary to use acids from which at least a portion of the non-acidic impurities has been removed. The refined acids may also be used in the preparation of any of the other metal salts to yield products having improved color and other properties.

To obtain a satisfactory refined product, it is necessary that at least 30% and preferably at least 50% of the non-acidic impurities be removed from the crude acid. This can be accomplished using any one of a number of known purification procedures. These include, for example, steam distillation or vacuum distillation of the acids as well as steam distillation or solvent extraction of an alkali metal salt of the acids. The preferred refining procedures are steam distillation of the crude acids and steam distillation of the alkali metal salts, and particularly the sodium salts, of the crude acids.

The metals which may be employed in the preparation of the metal soap compositions of the present invention are the so-called drying metals, that is, the metals that either singly or in admixture have the property of accelerating the drying of natural and synthetic drying and semi-drying oils and of certain resinous compositions prepared from these oils. The drying metals include the alkaline earth metals and the heavy metals. These are the metals which form with various monobasic organic acids water-insoluble salts or soaps. Illustrative of the useful metals are the following: barium, strontium, calcium, cobalt, load, iron, nickel, manganese, zinc, cadmium, vanadium, copper, mercury, and tin. A single metal or a combination of two or more of these metals may be present in the novel drier compositions.

The metal salts of this invention may be prepared by any of the methods known in the art. For example, they may be formed by the fusion of the acid or mixture of acids with the oxide, hydroxide, carbonate, acetate or other suitable compound of the drying metal. They may also be conveniently prepared by a double decomposition reaction between an alkali metal salt of the acid and a water-soluble salt of the metal. For example, the sodium or potassium salt of the acid may be reacted in aqueous or aqueous alcoholic solution with the sulfate or chloride of the metal.

The metal salt is then dissolved in an amount of a non-polar hydrocarbon solvent boiling at a temperature below approximately 500° F. which will form a solution having the required metal content. Suitable solvents include mineral spirits, Stoddard's solvent, benzene, toluene, xylene, naphtha, kerosene, dipentene, turpentine, and the like.

The metal salts of the present invention may be used alone in drier compositions or they may be used in combination with salts prepared from other organic acids, such as naphthenic acids or tall oil fatty acids. In addition to the metal salts and the solvent, the drier compositions may contain additives, such as stabilizers, dispersing agents, and antiskinning agents, in the amounts ordinarily employed for the purposes indicated.

The metal salts of the present invention are completely miscible with mineral spirits and other hydrocarbon solvents. Hydrocarbon solutions containing amounts of the salts that are necessary to provide the required metal content remain stable for at least six months on storage in an open container at room temperature or in a closed container at 0° F. These salts are also soluble in linseed oil and in other oils that are commonly used in the preparation of surface coating compositions.

The novel drier compositions provide these advantages over previously known drier compositions: They are much lower in viscosity, solids content and specific gravity than the corresponding naphthenates. They are at least equivalent to and in many cases superior to the naphthenates in color, stability, and drying characteristics and other paint properties. They are superior to the salts formed from tall oil fatty acids in color, drying characteristics, solids content, and specific gravity and to the 2-ethylhexoates in stability, particularly that of the basic lead salt.

This invention is illustrated by the examples that follow. It is to be understood, however, that the examples are for the purpose of illustration, and that the invention is not limited as to any of the specific materials or conditions set forth therein except as set forth in the accompanying claims.

EXAMPLE 1

Acid suitable for use in the preparation of stable metal salts was prepared by the oxidation of a mixture of aldehydes which contained principally isomeric trimethylheptanals. This mixture of aldehydes, which was obtained by the carbonylation of a mixture of isomeric nonenes, contained neither isomers having a methyl group in the 2-position of the carbon chain nor those having a quaternary carbon atom, that is, a carbon atom to which are attached two substituents. This material is an 85% $C_{10}$Oxo aldehyde, with a total carbonyl number of 312 mg. KOH/g. and a neutralization number of 6.6 mg. KOH/g.

Three thousand grams of the $C_{10}$Oxo aldehyde mixture was placed in a flask equipped with an agitator, an oxygen-feeding and regulating train, a vent valve, and a thermometer. After the system had been flushed with oxygen, the vent valve was closed, and oxygen was introduced into the reaction vessel at approximately the rate at which it reacted with the aldehydes. Since the oxidation is an exothermic reaction, the temperature of the reaction mixture rose rapidly as the oxygen was added. The reaction temperature was held between 115° and 130° F. by means of an external cooling water bath. The oxidation was continued until the acid number of the reaction mixture reached 253. This required approximately 15 hours. The crude product obtained was a mixture of acids and non-acidic materials, which contained approximately 23% of the non-acidic materials.

To the crude product was added 2232 grams of a 29.2% sodium hydroxide solution and 4200 grams of water. The resulting mixture was then heated at its boiling point to remove by steam-distillation approximately 50% of the non-acidic materials present. When the residue from the steam-distillation had been cooled to 100° F., a solution of 832.5 grams of 98% sulfuric acid in 2500 grams of water was added to it. The solvent phase was separated from the aqueous phase, washed with water at 140° F. until it was free of sulfuric acid, and then dried at 250° F. There was obtained 2755 grams of refined acid which had an acid number of 296 mg. KOH/g., specific gravity (80° F.) of 0.901, Gardner viscosity (80° F.) of A-3, and Gardner color of <1.

EXAMPLE 2

A 3000 gram charge of 85% $C_{10}$ Oxo aldehydes was converted to the corresponding mixture of acids by passing air through it at the rate of 0.27 cu. ft. per minute for 35 hours during which time the aldehyde mixture was held at 85°–105° F. There was obtained at 94% yield of crude acid, which had an acid number of 256. Steam distillation of the crude product yielded a refined product which had an acid number of 326 and which could be used in the preparation of stable metal drier compositions.

EXAMPLE 3

A mixture of 302 parts of the product of Example 1 and 400 parts of mineral spirits was heated to 210° F. Then 261 parts of litharge was added and the mixture was heated at 240°–250° F. until it was dry. Ten parts of a filter-aid was added, and the mixture was filtered. Sufficient mineral spirits was added to the filtrate to reduce its lead content to 24%. The resulting basic lead drier solution in a closed container was stable at 0° F. for more than seven months, was readily soluble in linseed oil, and was effective as a drier.

EXAMPLE 4

To a mixture of 150 parts of water and 326 parts of a 25% sodium hydroxide solution was added first 486 parts of the product of Example 1 and then 440 parts of mineral spirits. A solution of 286 parts of cobalt sulfate heptahydrate, which contained 20.95% of cobalt, in 532 parts of water was added to the reaction mixture. After agitation for 15 minutes, the phases were allowed to separate. The lower aqueous phase was drawn off and discarded. The solvent phase was heated at 250° F. until it was dry. Then 10 parts of a filter-aid was added, and the mixture was filtered. Sufficient mineral spirits was added to the filtrate to reduce its cobalt content to 6%. The resulting cobalt drier solution in a closed container was stable at 0° F. for at more than seven months, was readily soluble in linseed oil, and was effective as a drier.

EXAMPLE 5

To a mixture of 160 parts of water and 350 parts of a 25% sodium hydroxide solution was added first 515 parts of the product of Example 1 and then 450 parts of mineral spirits. To this solution was added 800 parts of an aqueous manganese sulfate solution which contained 7.5% of manganese. After agitation for 15 minutes, the phases were allowed to separate. The lower aqueous phase was drawn off and discarded. The solvent phase was heated to 250° F. in an atmosphere of nitrogen and held at this temperature until it was dry. Then 10 parts of a filter-aid was added, and the mixture was filtered. Sufficient mineral spirits was added to the filtrate to reduce its manganese content to 6%. The resulting manganese drier solution in a closed container was stable at 0° F. for more than seven months, was readily soluble in linseed oil, and was effective as a drier.

EXAMPLE 6

A calcium drier was prepared by the procedure described in Example 5 by using calcium chloride in place of manganese chloride. The resulting drier, which contained 5% of calcium, was stable at 0° F. for more than seven months, was readily soluble in linseed oil, and was effective as a drier.

EXAMPLE 7

A mixture of 500 parts of mineral spirits and 360 parts of the product of Example 1 was heated to 170° F. Then 100 parts of zinc oxide was added, and the mixture was heated at 240°–250° F. until it was dry. Ten parts of a filter-aid was added, and the mixture was filtered. Sufficient mineral spirits was then added to the filtrate to reduce its zinc content to 8%. The resulting basic zinc drier solution was stable in a closed container at 0° F. for more than seven months, was soluble in linseed oil, and was effective as a drier.

EXAMPLE 8

For comparative purposes a series of naphthenate salts was prepared by the procedures described in Examples 3 to 7. The physical properties of these naphthenate salts and of the products of Examples 3 to 7 are given in Table I which follows:

Table I

| | Percent Metal | Percent Solids | Specific Gravity (80° F.) | Gardner-Holdt Viscosity (77° F.) | Gardner Color |
|---|---|---|---|---|---|
| Product of Ex. 3 | 24% Lead | 53.2 | 1.090 | A-5 | 5 |
| Corresponding Naphthenate Salt. | ___do___ | 62.2 | 1.160 | A-1 | 7 |
| Product of Ex. 4 | 6% Cobalt | 42.4 | 0.898 | A-5 | |
| Corresponding Naphthenate Salt. | ___do___ | 59 | 0.960 | A-2 | |
| Product of Ex. 5 | 6% Manganese. | 47.5 | 0.897 | A-4 | 15 |
| Corresponding Naphthenate Salt. | ___do___ | 61 | 0.960 | A-2 | 15 |
| Product of Ex. 6 | 5% Calcium | 61.9 | 0.916 | C | 5 |
| Corresponding Naphthenate Salt. | 4% Calcium | 62 | 0.930 | D | 6 |
| Product of Ex. 7 | 8% Zinc | 39.9 | 0.889 | A-5 | 1 |
| Corresponding Naphthenate Salt. | ___do___ | 54 | 0.940 | A-3 | 5 |

Alkaline earth metals and heavy metals other than those used in the examples may also be used in the preparation of metal salts useful as driers.

The drier compositions of the present invention may be used in the film-forming bases conventionally employed in paints, varnishes, enamels, printing inks, and linoleum print paints containing a drying or semi-drying oil fatty acid radical. The film-forming base contains an amount of the drier composition that will correspond to 0.01% to 1 weight percent of the metal based on the polymerizable drying oil or semi-drying oil content of the base.

The composition of such film-forming bases is well known in the art. The bases may contain the usual pigments, extenders, and fillers and are prepared from drying or semi-drying oils, from esters of drying or semi-drying oil fatty acids with polyhydric alcohols, from drying or semi-drying oil modified resins, from modified rosin esters, from natural resins, and the like.

We claim:

1. A drier composition comprising a salt of a metal selected from the group consisting of alkaline earth metals, heavy metals, and mixtures thereof and a saturated, branched-chain, acyclic acid containing from 8 to 18 carbon atoms, said acid having at least 6 carbon atoms in its longest straight chain and having no substituent in the 2-position of said chain, and a liquid hydrocarbon solvent for said metal salt.

2. A drier composition comprising a salt of a metal selected from the group consisting of alkaline earth metals, heavy metals, and mixtures thereof and a saturated, branched-chain, acyclic acid containing from 9 to 12 carbon atoms, said acid having at least 6 carbon atoms in its longest straight chain and having no substituent in the 2-position of said carbon chain, and a liquid hydrocarbon solvent for said metal salt.

3. The drier composition as described in claim 2 wherein the metal is lead.

4. The drier composition as described in claim 2 wherein the metal is cobalt.

5. The drier composition as described in claim 2 wherein the metal is manganese.

6. The drier composition as described in claim 2 wherein the metal is calcium.

7. The drier composition as described in claim 2 wherein the metal is zinc.

8. A drier composition comprising a salt of a metal selected from the group consisting of alkaline earth metals, heavy metals, and mixtures thereof and a mixture of isomeric trimethylheptanoic acids, said mixture containing substantially no isomers having a methyl substituent in the 2-position, and a liquid hydrocarbon solvent for said salt.

9. The drier composition as described in claim 8 wherein the metal is lead.

References Cited in the file of this patent

UNITED STATES PATENTS

| | | |
|---|---|---|
| 2,251,798 | Meidert et al. | Aug. 5, 1941 |
| 2,727,050 | Sutton | Dec. 13, 1955 |
| 2,751,359 | Hill et al. | June 19, 1956 |
| 2,751,361 | Van Strien et al. | June 19, 1956 |
| 2,766,267 | Hill | Oct. 9, 1956 |
| 2,793,962 | Collins et al. | May 28, 1957 |
| 2,955,949 | Kirshenbaum et al. | Oct. 11, 1960 |
| 2,961,331 | Wheeler | Nov. 28, 1960 |